United States Patent
Uvarov et al.

(10) Patent No.: US 7,577,315 B2
(45) Date of Patent: Aug. 18, 2009

(54) METHOD AND APPARATUS FOR PROCESSING IMAGE DATA OF A COLOR FILTER ARRAY

(75) Inventors: Timofei Uvarov, Suwon-Si (KR); Hyung-Guen Lee, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 482 days.

(21) Appl. No.: 11/250,015

(22) Filed: Oct. 13, 2005

(65) Prior Publication Data
US 2006/0133697 A1 Jun. 22, 2006

(30) Foreign Application Priority Data
Dec. 16, 2004 (KR) .................. 10-2004-0107213

(51) Int. Cl.
*G06K 9/32* (2006.01)
(52) U.S. Cl. .................. 382/300; 382/260; 348/E9.01
(58) Field of Classification Search ............... 382/300, 382/260
See application file for complete search history.

(56) References Cited

U.S. PATENT DOCUMENTS

| | | | |
|---|---|---|---|
| 3,971,065 A * | 7/1976 | Bayer | 348/276 |
| 5,506,619 A | 4/1996 | Adams, Jr. et al. | 348/272 |
| 5,631,703 A | 5/1997 | Hamilton, Jr. et al. | 348/273 |
| 6,832,009 B1 * | 12/2004 | Shezaf et al. | 382/300 |
| 7,072,508 B2 * | 7/2006 | Dance | 382/167 |
| 2002/0122175 A1 * | 9/2002 | Dance | 356/317 |
| 2002/0167602 A1 * | 11/2002 | Nguyen | 348/280 |
| 2003/0081465 A1 | 5/2003 | Cho | |

OTHER PUBLICATIONS

Japanese Patent Application No. 10-315164 to Toshihisa, having Publication date of Aug. 10, 1999 (w/ English Abstract page).

* cited by examiner

*Primary Examiner*—Samir A. Ahmed
*Assistant Examiner*—Stephen R Koziol
(74) *Attorney, Agent, or Firm*—Monica H. Choi (57) ABSTRACT

For processing image data generated for a color filter array, classifiers are generated from the image data. A predetermined color component is determined by directional-interpolating the image data depending on the classifiers. Chrominance components are generated from linear-interpolated image data and the directional-interpolated predetermined color component. The chrominance components are directional-interpolated, and color components are extracted from the directional-interpolated chrominance components.

18 Claims, 7 Drawing Sheets

FIG. 1 (PRIOR ART)

| G | R | G | R | G | R | G | R |
|---|---|---|---|---|---|---|---|
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |

| | G2 | |
|---|---|---|
| G4 | G5? | G6 |
| | G8 | |

FIG. 4B

| R1 | R2? | R3 |
|---|---|---|
| R4? | R5? | R6? |
| R7 | R8? | R9 |

| $K_b$[lt] | $K_r$[top] | $K_b$[rt] |
|---|---|---|
| $K_r$[left] | R [currnet] | $K_r$[right] |
| $K_b$[lb] | $K_r$[bottom] | $K_b$[rb] |

FIG. 7B

| $K_r$[lt] | $K_b$[top] | $K_r$[rt] |
|---|---|---|
| $K_b$[left] | B [currnet] | $K_b$[right] |
| $K_r$[lb] | $K_b$[bottom] | $K_r$[rb] |

METHOD AND APPARATUS FOR PROCESSING IMAGE DATA OF A COLOR FILTER ARRAY

This application claims priority to Korean Patent Application No. 2004-107213, filed on Dec. 16, 2004, in the Korean Intellectual Property Office, the disclosure of which is incorporated herein in its entirety by reference.

BACKGROUND OF THE INVENTION

1. Field of the Invention

The present invention relates generally to image processing, and more particularly, to a method and apparatus for interpolating image data corresponding to a CFA (color filter array) such as a Bayer CFA.

2. Description of the Related Art

Figure 1:
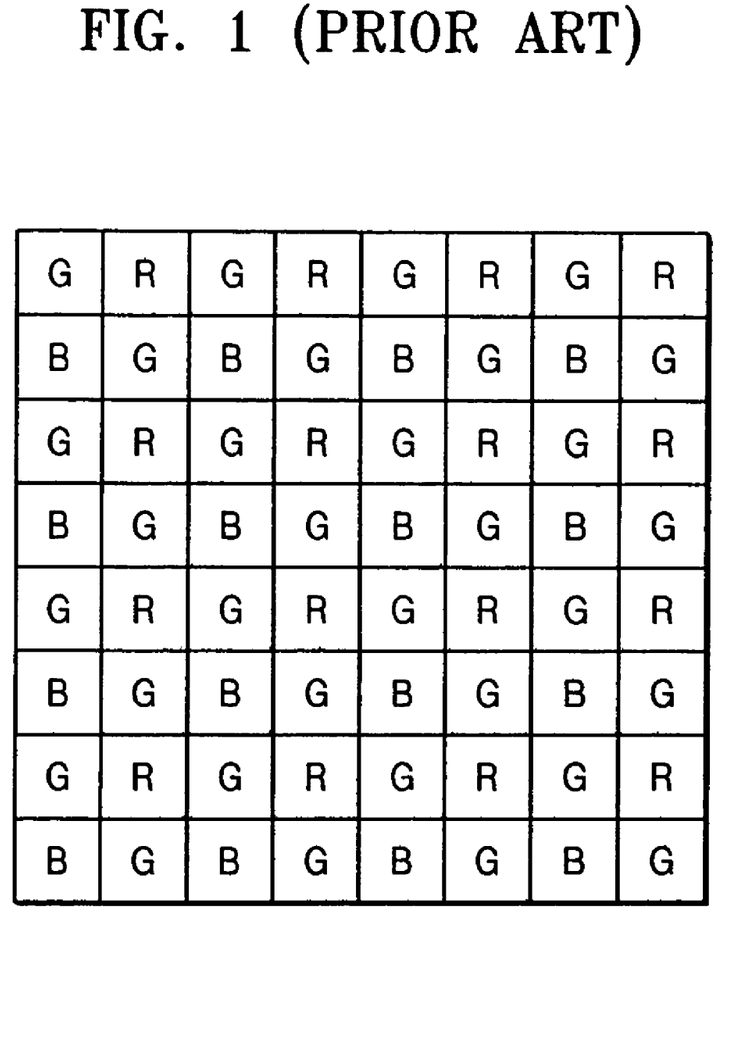
FIG. 1 shows a color pattern for a conventional Bayer color filter array.

Image-sensing systems such as digital still cameras, mobile phone cameras, or the like include an image-sensing device in an active pixel sensor array form. Such an image-sensing device generates digital image data with three colors (i.e., green (G), blue (B), and red (R)) in a Bayer color pattern as shown in FIG. 1. In a case where an image-sensing device adopts a Bayer color filter array (CFA), a Complementary Metal-Oxide Semiconductor (CMOS) image sensor (CIS) for each pixel generates image data corresponding to one of the R, G, and B colors.

If an image were displayed using only each pixel data generated by the image-sensing device, the displayed image would be seriously distorted with poor visual quality. Therefore, a subsequent interpolator determines two missing color components for each pixel data using neighboring pixel data. An image displayed using the resulting three-color data for each pixel has improved visual quality.

Well-known interpolation methods include a bilinear interpolation method, a smooth hue-transition method, a PEI's method, a directional interpolation method, an Adams' method, an Adams-PEI method, a Kimmel's method, and so on. U.S. Pat. No. 5,506,619 and Korean Patent Application No. 2001-56442 disclose conventional interpolation methods of obtaining pixel data of two missing colors for each pixel using neighboring pixel data.

However, in the above-mentioned conventional interpolation methods, distortion of a displayed image is not fully corrected. Distortion of an image includes a zipper effect, i.e., aliasing, color moire, loss of detail blurring, a false/pseudo color effect, and the like.

SUMMARY OF THE INVENTION

Accordingly, the present invention strives to minimize image distortion when interpolating missing color components of image data corresponding to a color filter array.

In a method and apparatus of an aspect of the present invention for processing image data generated according to a color filter array, classifiers are generated from the image data. In addition, a predetermined color component is determined by directional-interpolating the image data depending on the classifiers. Furthermore, image data is linear-interpolated for generating at least one other color component aside from the predetermined color component. Chrominance components are also generated from the linear-interpolated image data and the directional-interpolated predetermined color component.

In one embodiment of the present invention, the color filter array has a Bayer color pattern. In that case, the predetermined color component is for a green color, and the at least one other color component includes red and blue colors.

In another embodiment of the present invention, the step of generating the classifiers includes generating horizontal and vertical classifiers. In that case, the step of generating the classifiers includes calculating the horizontal classifier for a current pixel using the image data for the current pixel and additional pixels to a left and right of the current pixel, and calculating the vertical classifier for the current pixel using the image data for the current pixel and additional pixels to a top and bottom of the current pixel.

In a further embodiment of the present invention, the horizontal classifier is adjusted by averaging horizontal classifiers of the current pixel and adjoining pixels, and the vertical classifier is adjusted by averaging vertical classifiers of the current pixel and adjoining pixels, when a difference between the horizontal and vertical classifiers for the current pixel is less than a threshold.

In another embodiment of the present invention, a horizontal convolution value is calculated for the directional-interpolated predetermined color component if the vertical classifier is greater than the horizontal classifier. On the other hand, a vertical convolution value is calculated for the directional-interpolated predetermined color component if the vertical classifier is less than the horizontal classifier. Alternatively, the horizontal and vertical convolution values are averaged for the directional-interpolated predetermined color component if the vertical classifier is substantially equal to the horizontal classifier.

In a further embodiment of the present invention, the classifiers are recalculated using the directional-interpolated predetermined color component. In addition, the chrominance components are directional-interpolated depending on the classifiers, and at least one color component of a pixel is extracted using the directional-interpolated chrominance components.

In this manner, both linear and directional interpolations are performed for the image data corresponding to the color filter array and the chrominance components. Such multiple types of interpolations improve visual quality in an imaging system.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2, 3, 4A, 4B, 5A, 5B, 5C, 6, 7A, and 7B refer to elements having similar structure and/or function.

DETAILED DESCRIPTION OF THE INVENTION

Figure 2:
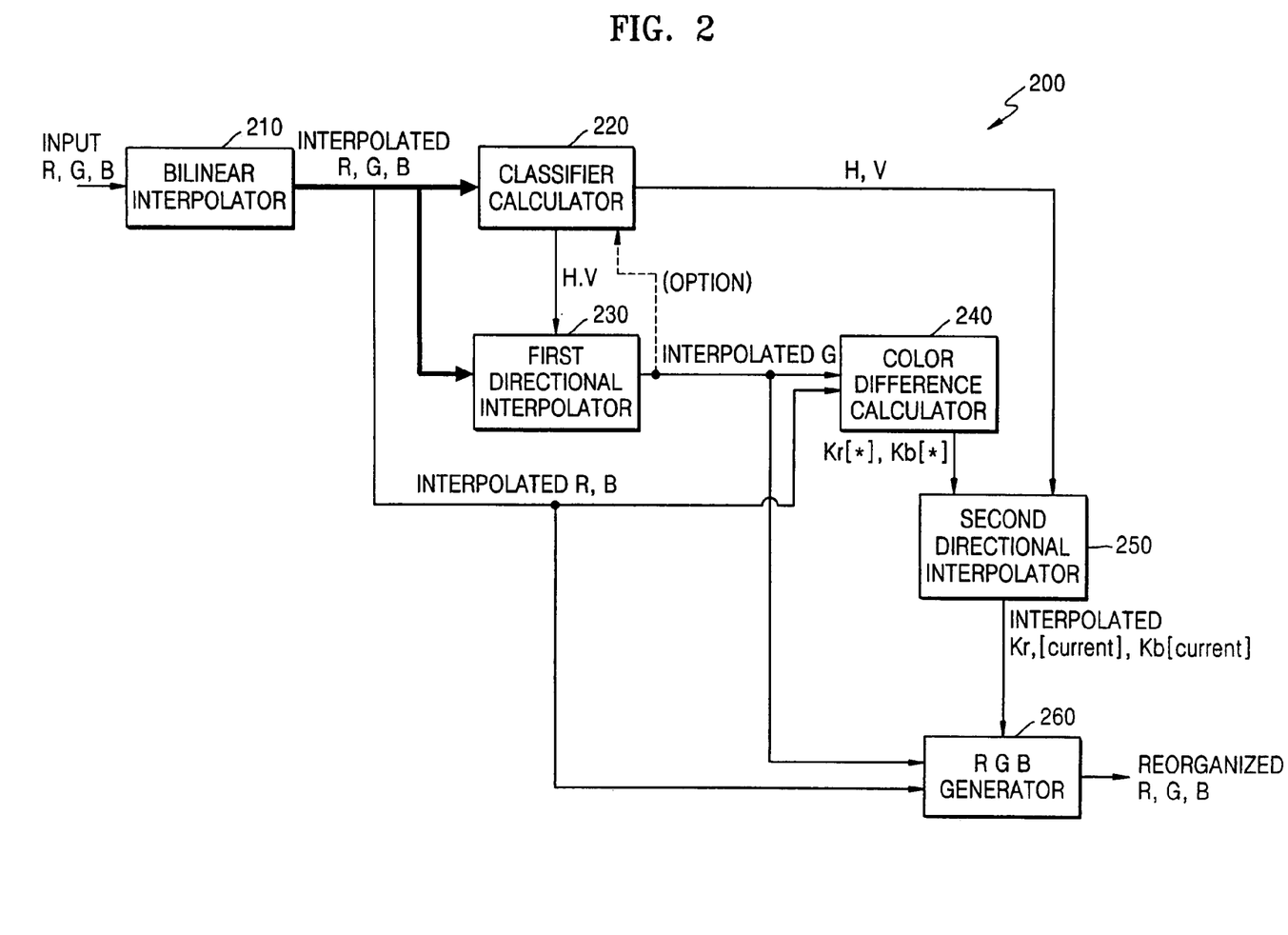
FIG. 2 shows a block diagram of a color signal interpolating apparatus, according to an embodiment of the present invention.

FIG. 2 shows a block diagram of a color signal interpolating apparatus 200, according to an embodiment of the present invention. Referring to FIG. 2, the color signal interpolating apparatus 200 includes a linear interpolator 210, a classifier calculator 220, a first directional interpolator 230, a color difference calculator 240, a second directional interpolator 250, and an RGB generator 260.

The linear interpolator 210 receives R, G, and B pixel image data and linear-interpolates the R, G, and B pixel image data using neighboring pixel image data to generate linear-interpolated R, G, and B data of each pixel. The R, G, and B pixel image data is from an image sensor with a Bayer-pattern CFA (color filter array) according to an example embodiment of the present invention. However, the present invention may be practiced for other types of color filter arrays.

The classifier calculator 220 generates directional, i.e., horizontal and vertical, classifiers H and V from the linear-interpolated R, B, and G pixel image data output from the linear interpolator 210. The horizontal classifier H indicates a horizontal gradient of data neighboring a current pixel, and the vertical classifier V indicates a vertical gradient of the data neighboring the current pixel.

Moire phenomenon in an interpolated image may occur due to aliasing of R and B color components. Sampling frequencies of the R and B color components may not be sufficient to compensate high spatial frequencies and thus may cause aliasing.

Directional interpolation is performed with respect to a predetermined color component such as the green (G) color to interpolate chrominance components, according to an embodiment of the present invention. For this purpose, the first directional interpolator 230 performs directional interpolation with the linear-interpolated R, B, and G pixel image data output from the linear interpolator 210 according to the horizontal and vertical classifiers H and V. As a result, the first directional interpolator 230 generates directional-interpolated G data.

In addition, the classifier calculator 220 may re-calculate the horizontal and vertical classifiers H and V using only the directional-interpolated G data from the first directional interpolator 230 to output the re-calculated horizontal and vertical classifiers as the horizontal and vertical classifiers H and V. Alternatively, the classifier calculator 220 may re-calculate the horizontal and vertical classifiers H and V using the linear-interpolated R and B data from the linear interpolator 210 and the directional-interpolated G data from the first directional interpolator 230 to output the re-calculated horizontal and vertical classifiers as the horizontal and vertical classifiers H and V. The re-calculation of the horizontal and vertical classifiers H and V by the classifier calculator 220 is optional. The re-calculation of the horizontal and vertical classifiers H and V may further improve visual quality.

The color difference calculator 240 generates first chrominance components Kr[*](/Kb[*]) and second chrominance components Kb[*](/Kr[*]) neighboring the current pixel from the linear-interpolated R and B data from the linear interpolator 210 and the directional-interpolated G data from the first directional interpolator 230. The second directional interpolator 250 directional-interpolates the first and second chrominance components Kr[*](/Kb[*]) and Kb[*](/Kr[*]) according to the horizontal and vertical classifiers H and V output from the classifier calculator 220 to generate first and second chrominance data Kr[current](/Kb[current]) and Kb[current](/Kr[current]) of the current pixel.

The RGB generator 260 extracts two missing color components for each pixel from the linear-interpolated R and B data from the linear interpolator 210, the directional-interpolated G data from the directional interpolator 230, and the first and second chrominance data Kr[current](/Kb[current]) and Kb[current](/Kr[current]) from the second directional interpolator 250 to output reorganized R, G, and B data. For example, G and B data is extracted for an R pixel, R and B data is extracted for a G pixel, and R and G data is extracted for a B pixel. As a result, R, G, and B data is output for each pixel from the RGB generator 260.

Figure 3:
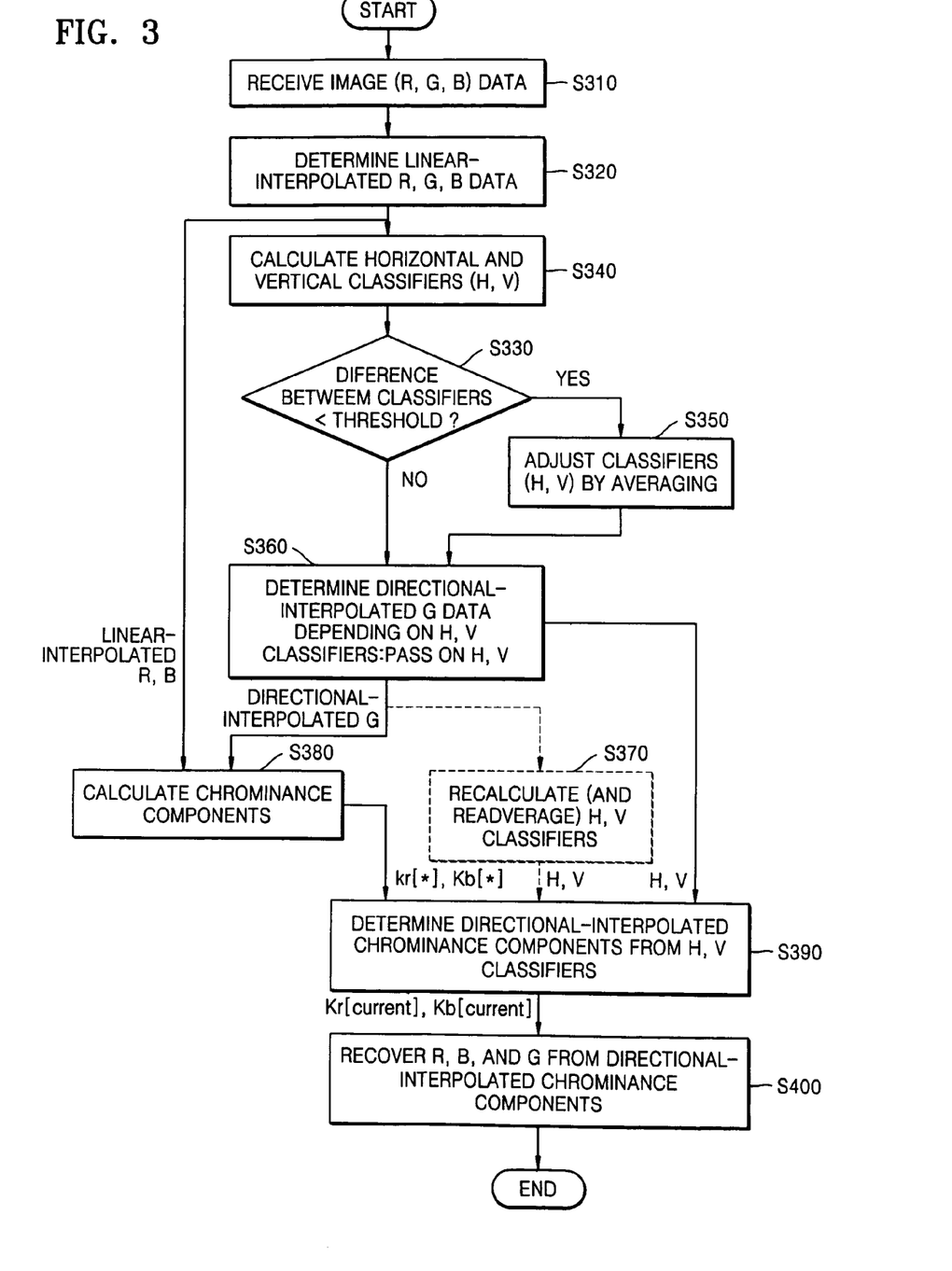
FIG. 3 is a flowchart of steps during operation of the color signal interpolating apparatus of FIG. 2, according to an embodiment of the present invention.

Operation of the color signal interpolating apparatus 200 is described in more detail with reference to the flow-chart of FIG. 3. Referring to FIGS. 2 and 3, the linear interpolator 210 receives pixel image data (input R, G, B data) from an image sensor generated according to a Bayer color filter array for example (step S310 in FIG. 3).

The linear interpolator 210 linear-interpolates the R, G, and B pixel image data using neighboring pixel data (step S320 of FIG. 3). For example, in FIG. 4A, G2, G4, G6, and G8 pixel image data neighbor the pixel with the G5 data to be determined for a central R or B pixel. The linear-interpolated G5 data may be determined as G5=(G2+G8)/2, or G5=(G4+G6)/2.

Figure 4A:
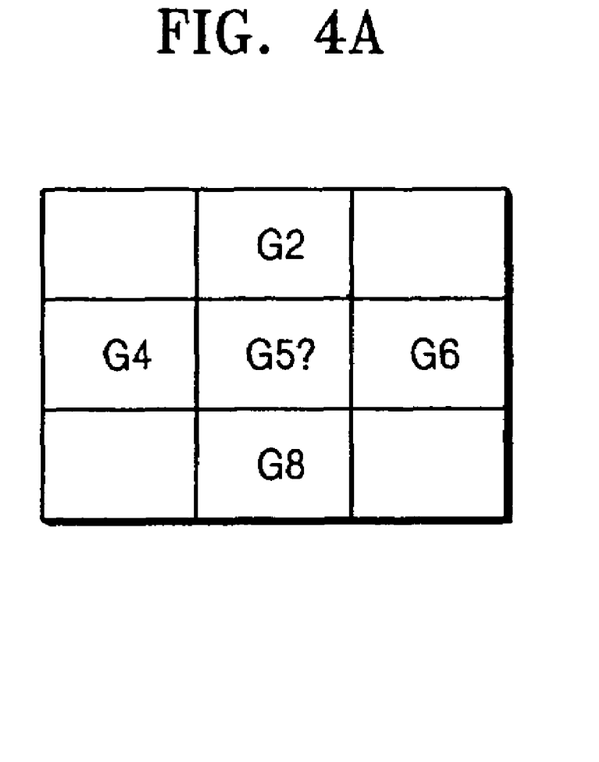
FIGS. 4A and 4B illustrate color components to be determined from interpolation according to an embodiment of the present invention.
Figure 4B:
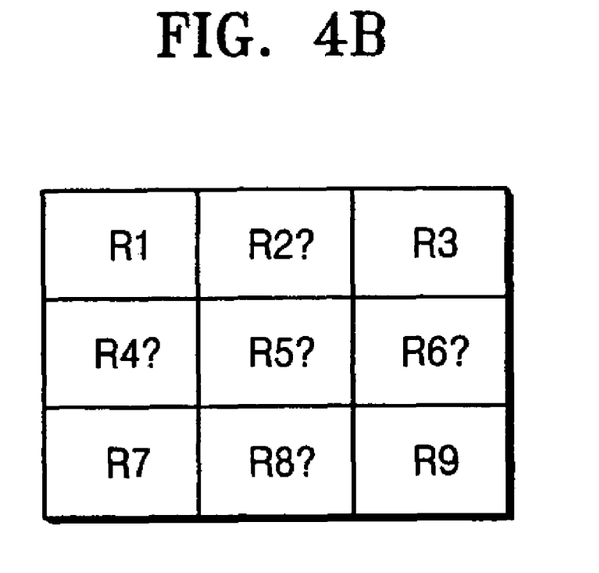

In FIG. 4B, R1, R3, R7, and R9 pixel image data neighbor the pixel with the R2, R4, R5, R6, and R8 data to be determined for corresponding G pixels and a B pixel. The linear-interpolated R2, R4, R6, and R8 data for the G pixels may be determined as R2=(R1+R3)/2, R4=(R1+R7)/2, R6=(R3+R8)/2, and R8=(R7+R9)/2, while R5 of the central B pixel is not calculated. Also, in step S320, linear-interpolated B data of the G pixels is similarly calculated. In addition, pixel image data from the image sensor is output as is from the linear interpolator 210 as the linear interpolated image data.

Figure 5A:
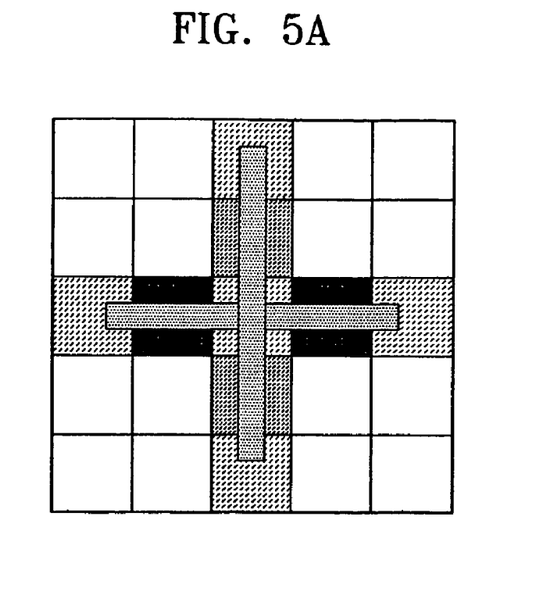
FIG. 5A illustrates pixel data used for calculating horizontal and vertical classifiers, according to an embodiment of the present invention.

In addition, the classifier calculator 220 generates the horizontal and vertical classifiers H and V using the linear-interpolated R, B, and G pixel image data output from the linear interpolator 210 (step S340 of FIG. 3). The horizontal classifier H indicates a gradient of the current pixel using two horizontal image data on the left side of the current pixel, and two horizontal image data on the right side of the current pixel as illustrated in FIG. 5A. For example, if 5 horizontal pixel image data including a current pixel R3 is R1, G2, R3, G4, and R5, the horizontal classifier H may be calculated as H=w1*ABS(G2−G4)+w2*ABS(R1−2R3+R5). Here, ABS( ) denotes an absolute value, and w1 and w2 denote weight coefficients. The vertical classifier V is similarly calculated from 5 vertical pixel image data including the current pixel (including two vertical image data on the top side and two vertical image data on the bottom side of the current pixel).

If a difference between the horizontal and vertical classifiers H and V is smaller than a first threshold value (step S330 in FIG. 3), the classifier calculator 220 averages the horizontal and vertical classifiers H and V (step S350 in FIG. 3). For example in that case, the classifier calculator 220 sums horizontal classifiers H[left] and H[right] on the left and right sides of the current pixel and a horizontal classifier H[current] of the current pixel with respective weight coefficients to generate the sum result as the horizontal classifier H.

Figure 5B:
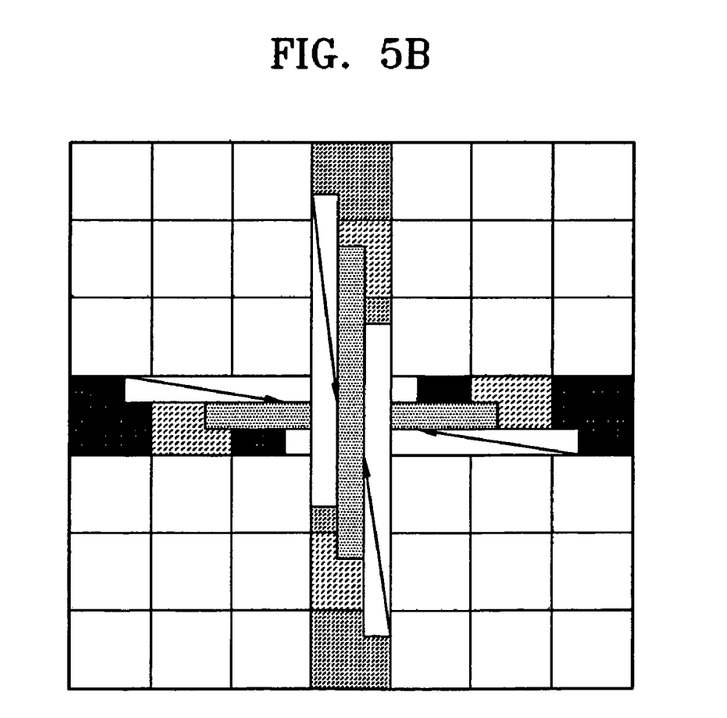
FIGS. 5B and 5C illustrate pixel data used for averaging the horizontal and vertical classifiers, according to an embodiment of the present invention.

Similarly, the classifier calculator 220 sums vertical classifiers V[top] and V[bottom] at the top and bottom of the current pixel and a vertical classifier V[current] of the current pixel with respective weight coefficients to generate the sum result as the vertical classifier V as in Equation 1 below. Thus, a 7×7 window of pixel image data as shown in FIG. 5B is used to average the horizontal and vertical classifiers H and V. In Equation 1 below, w1 and w2 denote weight coefficients.

$$V = w1*V[\text{current}] + w2(V[\text{top}] + V[\text{bottom}])$$

$$H = w1*H[\text{current}] + w2(H[\text{left}] + H[\text{right}]) \quad \text{[Equation 1]}$$

In addition, if the difference between such averaged classifiers H and V is greater than the first threshold value but smaller than a second threshold value, the classifier calculator 220 may further re-average the classifiers H and V. For example in that case, the classifier calculator 220 sums vertical classifiers V[left] and V[right] on the left and right sides of the current pixel and the vertical classifier V[current] of the current pixel with respective weight coefficients to generate the sum result as the vertical classifier V.

Figure 5C:
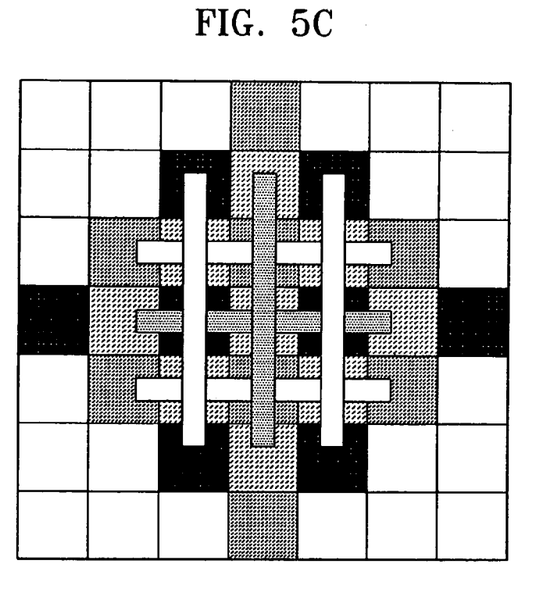

Similarly, the classifier calculator 220 sums horizontal classifiers H[top] and H[bottom] at the top and bottom of the current pixel and the horizontal classifier H[current] of the current pixel with respective weight coefficients to generate the sum result as the horizontal classifier H as in Equation 2 below. Thus, a 7×7 window of pixel image data as shown in FIG. 5C is used to further re-average the averaged horizontal and vertical classifiers H and V. In Equation 2, w1 and w2 denote weight coefficients.

$$V = w1*V[\text{current}] + w2(V[\text{left}] + V[\text{right}])$$

$$H = w1*H[\text{current}] + w2(H[\text{top}] + H[\text{bottom}]) \quad \text{[Equation 2]}$$

Further referring to FIGS. 2 and 3, the first directional interpolator 230 performs the directional interpolation from the linear-interpolated R, B, and G pixel image data output from the linear interpolator 210 to generate directional-interpolated G data depending on the horizontal and vertical classifiers H and V (step S360 of FIG. 3). Here, the directional-interpolated G data of the R and B pixels is generated.

For example, if the vertical classifier V is greater than the horizontal classifier H, a horizontal convolution value HC(current) is calculated as the directional-interpolated G data G[current] as in Equation 3 below. HC(current) is calculated from the image data for the current pixel, two pixels on the left side of the current pixel, and two pixels on the right side of the current pixel. For example, if 5 horizontal image data from the image sensor including the current pixel R3 is R1, G2, R3, G4, and R5, HC(current)=w*(G2+G4)+(a*R1+b*R3+a*R5). Here, w, a, and b denote weight coefficients.

$$G[\text{current}] = HC(\text{current}) \quad \text{[Equation 3]}$$

On the other hand, if the vertical classifier V is smaller than the horizontal classifier H, a vertical convolution value VC(current) is calculated as the directional-interpolated G data G[current] as in Equation 4 below. The VC(current) is calculated from 5 vertical data including a current pixel similarly as described for calculating the HC(current).

$$G[\text{current}] = VC(\text{current}) \quad \text{[Equation 4]}$$

If the vertical classifier V is equal to or close in value to the horizontal classifier H, an average of the HC(current) and VC(current) is generated as the directional-interpolated G data G[current] as in Equation 5 below.

$$G[\text{current}] = \{HC(\text{current}) + VC(\text{current})\}/2 \quad \text{[Equation 5]}$$

Figure 6:
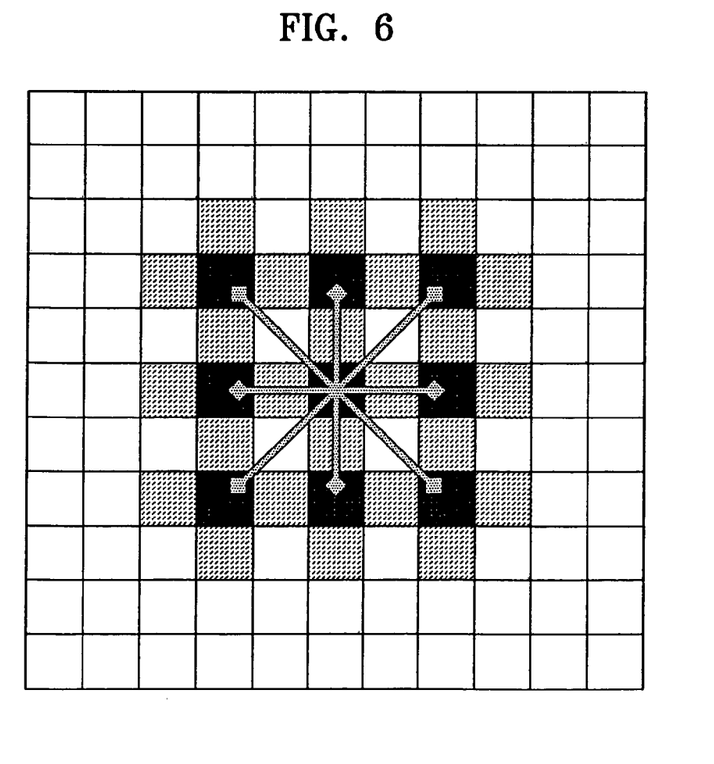
FIG. 6 illustrates pixel data used for recalculation of horizontal and vertical classifiers, according to an embodiment of the present invention.

In step S370, the classifier calculator 220 may re-calculate and re-average the horizontal and vertical classifiers H and V using the directional-interpolated G data. However, step S370 is optional (as illustrated by the dashed lines in FIG. 3). For example, the re-calculation and re-averaging of the horizontal and vertical classifiers H and V are performed using only the directional-interpolated G data output from the first directional interpolator 230. For example, the H and V classifiers may be generated by a weighted sum of the directional-interpolated G data. In that case, pixel image data in a 11×11 window as shown in FIG. 6 are used to re-calculate and re-average the horizontal and vertical classifiers H and V since image data for four additional pixels around the 7×7 windows are used for determining the multiple classifiers to be averaged.

Alternatively to using only the directional-interpolated G data, both the linear-interpolated R and B data from the linear interpolator 210 and the directional-interpolated G data from the first directional interpolator 230 may be used to re-calculate and re-average the horizontal and vertical classifiers H and V. For example, the H and V classifiers may be generated by a weighted sum of the linear-interpolated R and B data and the directional-interpolated G data.

Figure 7A:
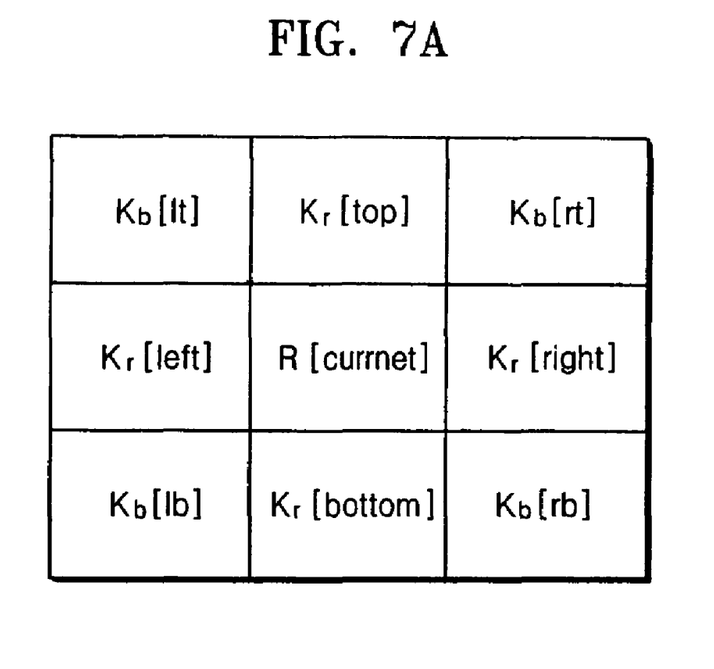
FIGS. 7A and 7B illustrate calculation of chrominance components, according to an embodiment of the present invention.

Further referring to FIGS. 2 and 3, the color difference calculator 240 generates the first and second chrominance components Kr[*](/Kb[*]) and Kb[*](/Kr[*]) neighboring the current pixel from the linear-interpolated R and B data from the linear interpolator 210 and the directional-interpolated G data from the first directional interpolator 230 (step S380 of FIG. 3). As shown in FIG. 7A for example, the color difference calculator 240 generates first chrominance components Kr[top], Kr[bottom], Kr[left], and Kr[right] of G pixels to the top, bottom, left, and right of a current R pixel R[current] and second chrominance components Kb[lt], Kb[rt], Kb[lb], and Kb[rb] of B pixels at the left top, right top, left bottom, and right bottom of the current R pixel R[current].

Thus, the first chrominance components Kr[*] may be calculated from the directional-interpolated G data and the linear-interpolated R data of G pixels as in Equation 6 below, and the second chrominance components Kb[*] may be calculated from the directional-interpolated G data and the linear-interpolated B data of B pixels as in Equation 7 below. Note that such linear-interpolated B data of such B pixels is the original pixel image B data from the image sensor.

$$Kr[\text{top}] = G[\text{top}] - R[\text{top}]$$

$$Kr[\text{bottom}] = G[\text{bottom}] - R[\text{bottom}]$$

$$Kr[\text{left}] = G[\text{left}] - R[\text{left}]$$

$$Kr[\text{right}] = G[\text{right}] - R[\text{right}] \quad \text{[Equation 6]}$$

$$Kb[lt] = G[lt] - B[lt]$$

$$Kb[rt] = G[rt] - B[rt]$$

$$Kb[lb] = G[lb] - B[lb]$$

$$Kb[rb] = G[rb] - B[rb] \quad \text{[Equation 7]}$$

Figure 7B:
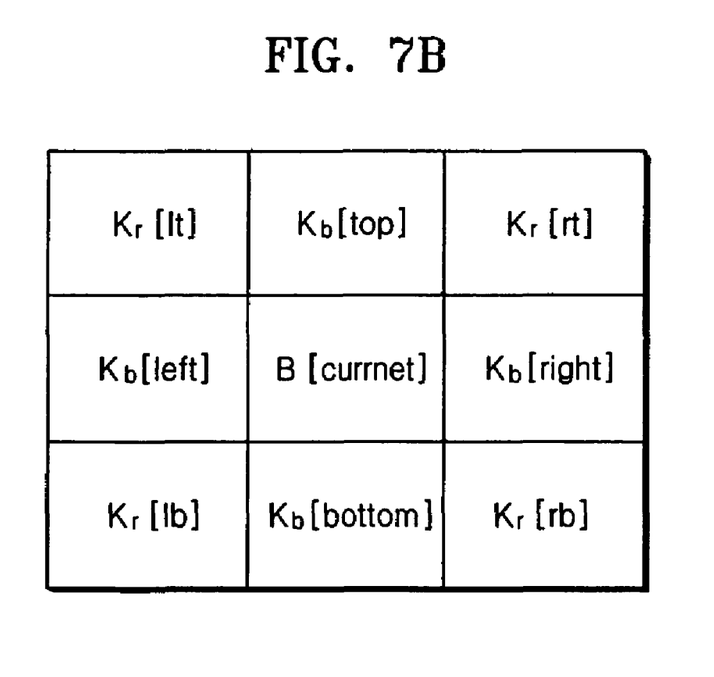

Similarly as shown in FIG. 7B, the color difference calculator 240 also generates the first chrominance components Kb[top], Kb[bottom], Kb[left], and Kb[right] of G pixels at the top, bottom, left, and right of a current B pixel B[current]. The color difference calculator 240 similarly generates the second chrominance components Kr[lt], Kr[rt], Kr[lb], and Kr[rb] of R pixels at the left top, right top, left bottom, and right bottom of the current B pixel B[current]. Similarly for the current G pixel, Kb[*] is generated as the first chrominance components, and Kr[*] is generated as the second chrominance components.

In step S390, the second directional interpolator 250 directional-interpolates the first and second chrominance components Kr[*](/Kb[*]) and Kb[*](/Kr[*]) depending on the horizontal and vertical classifiers H and V to generate first and second chrominance data Kr[current](/Kb[current]) and Kb[current](/Kr[current]) of the current pixel. First chrominance data Kr[current](/Kb[current]) is obtained by directional-interpolating the first chrominance components Kr[*] (/Kb[*]). Second chrominance data Kb[current](/Kr [current]) is obtained by directional-interpolating the second chrominance components Kb[*](/Kr[*]).

For example, if the vertical classifier V is greater than the horizontal classifier H for a current R pixel, an average of chrominance components on the left and right sides of the current R pixel is generated as the directional-interpolated first chrominance data Kr[current], as in Equation 8 below.

$$Kr[current]=(Kr[left]+Kr[right])/2 \quad [\text{Equation 8}]$$

On the other hand, if the vertical classifier V is smaller than the horizontal classifier H for the current R pixel, an average of chrominance components Kr[top] and Kr[bottom] at the top and bottom of the current R pixel is generated as the directional-interpolated first chrominance data Kr[current], as in Equation 9 below.

$$Kr[current]=(Kr[top]+Kr[bottom])/2 \quad [\text{Equation 9}]$$

If the vertical classifier V is equal or close in value to the horizontal classifier H for the current R pixel, a further average of the averages is generated as the directional-interpolated first chrominance data Kr[current], as in Equation 10 below.

$$Kr[current]=(Kr[left]+Kr[right]+Kr[top]+Kr[bottom])/4 \quad [\text{Equation 10}]$$

The method of obtaining the first chrominance data Kr[current] for the current R pixel is also used for the current B and G pixels to similarly generate the first chrominance data Kr[current](/Kb[current]) for the current B and G pixels.

Median filtering is performed to obtain the second chrominance data Kb[current](/Kr[current]) from the second chrominance components Kb[*](/Kr[*]) diagonal to a current pixel. For example, the second chrominance data Kb[current] is generated from median filtering of the second chrominance components Kb[lt], Kb[rt], Kb[lb], and Kb[rb] for the current R pixel. If values of the second chrominance components Kb[lt], Kb[rt], Kb[lb], and Kb[rb] are 8, 3, 10, and 2, respectively, a median filtering value is calculated as (3+8)/2.

As is well known, "median filtering" refers to an average of the values in a set except for a minimum and a maximum in the set. Similarly, second chrominance data for the current B and G pixels is determined by median filtering of the second chrominance components Kb[*](/Kr[*]) diagonal to the current B and G pixels.

In step S400, the RGB generator 260 extracts two missing components of each pixel using the first chrominance data Kr[current](/Kb[current]) and the second chrominance data Kb[current](/Kr[current]) from the second directional interpolator 250. The linear-interpolated R and B data from the linear interpolator 210 and the directional-interpolated G data from the first directional interpolator 230 are also used to extract the two missing components. For example, G and B data G[current] and B[current] of a current R pixel may be obtained as in Equation 11 below.

$$G[current]=R[current]+Kr[current]$$

$$B[current]=G[current]-Kb[current] \quad [\text{Equation 11}]$$

In this manner, the extracted G[current] and B[current] and the current R pixel R[current] form the reorganized R, G, and B data to be subsequently processed for display as an image on a screen.

In this manner, both linear and directional interpolations of the image data of the Bayer color filter array and the chrominance components are performed. Such multiple types of interpolations improve visual quality. Thus, image distortion from aliasing, color moire, blurring, a false and/pseudo color effect, and the like is minimized for improved visual quality.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of processing image data generated according to a color filter array, comprising:
    generating horizontal and vertical classifiers from the image data;
    directional-interpolating a predetermined color component from the image data depending on the classifiers to generate a directional-interpolated color component, wherein the predetermined color component is determined from a selected one of a row of the image data or a column of the image data depending on which of the horizontal classifier and the vertical classifier is greater; and
    generating chrominance components from the directional-interpolated predetermined color component and image data for at least one other color component aside from the predetermined color component,
    wherein the directional-interpolated color component has a value of a horizontal convolution current if the vertical classifier is greater than the horizontal classifier, a value of a vertical convolution current if the vertical classifier is less than the horizontal classifier, and an average of the values of the horizontal and vertical convolution currents if the vertical classifier is equal to the horizontal classifier.

2. The method of claim 1, wherein the color filter array has a Bayer color pattern.

3. The method of claim 2, wherein the predetermined color component is for a green color.

4. The method of claim 3, wherein the image data is linear-interpolated data for data generated from a color filter array and the at least one other color component includes linear-interpolated image data of red and blue colors.

5. The method of claim 1, wherein the step of generating the classifiers includes:
    calculating the horizontal classifier for a current pixel using the image data for the current pixel and additional pixels to a left and right of the current pixel; and
    calculating the vertical classifier for the current pixel using the image data for the current pixel and additional pixels to a top and bottom of the current pixel.

6. The method of claim 5, further comprising:
adjusting the horizontal classifier by averaging horizontal classifiers of the current pixel and adjoining pixels, and adjusting the vertical classifier by averaging vertical classifiers of the current pixel and adjoining pixels, when a difference between the horizontal and vertical classifiers for the current pixel is less than a threshold.

7. The method of claim 1, further comprising:
calculating a horizontal convolution value from the row of the image data that is selected for the directional-interpolated predetermined color component if the vertical classifier is greater than the horizontal classifier;
calculating a vertical convolution value from the column of the image data that is selected for the directional-interpolated predetermined color component if the vertical classifier is less than the horizontal classifier; and
averaging the horizontal and vertical convolution values for the directional-interpolated predetermined color component if the vertical classifier is substantially equal to the horizontal classifier.

8. The method of claim 1, further comprising:
recalculating the classifiers using the directional-interpolated predetermined color component.

9. The method of claim 1, further comprising:
directional-interpolating the chrominance components depending on the classifiers; and
extracting at least one color component of a pixel using the directional-interpolated chrominance components of the pixel.

10. An apparatus for processing image data generated according to a color filter array, comprising:
a classifier calculator for generating horizontal and vertical classifiers from the image data;
a first directional interpolator for directional-interpolating a predetermined color component from the image data depending on the classifiers to generate a directional-interpolated color component, wherein the predetermined color component is determined from a selected one of a row of the image data or a column of the image data depending on which of the horizontal classifier and the vertical classifier is greater; and
a color difference calculator for generating chrominance components from the directional-interpolated predetermined color component and image data for at least one other color component aside from the predetermined color component,
wherein the directional-interpolated color component has a value of a horizontal convolution current if the vertical classifier is greater than the horizontal classifier, a value of a vertical convolution current if the vertical classifier is less than the horizontal classifier, and an average of the values of the horizontal and vertical convolution currents if the vertical classifier is equal to the horizontal classifier.

11. The apparatus of claim 10, wherein the color filter array has a Bayer color pattern.

12. The apparatus of claim 11, wherein the predetermined color component is for a green color.

13. The apparatus of claim 12, wherein the image data is linear-interpolated data for data generated from a color filter array and the at least one other color component includes linear-interpolated image data of red and blue colors.

14. The apparatus of claim 10, wherein the classifier calculator calculates the horizontal classifier for a current pixel using the image data for the current pixel and additional pixels to a left and right of the current pixel, and calculates the vertical classifier for the current pixel using the image data for the current pixel and additional pixels to a top and bottom of the current pixel.

15. The apparatus of claim 14, wherein the classifier calculator adjusts the horizontal classifier by averaging horizontal classifiers of the current pixel and adjoining pixels, and adjusts the vertical classifier by averaging vertical classifiers of the current pixel and adjoining pixels, when a difference between the horizontal and vertical classifiers for the current pixel is less than a threshold.

16. The apparatus of claim 10, wherein the first directional interpolator calculates a horizontal convolution value from the row of the image data that is selected for the directional-interpolated predetermined color component if the vertical classifier is greater than the horizontal classifier, calculates a vertical convolution value from the column of the image data that is selected for the directional-interpolated predetermined color component if the vertical classifier is less than the horizontal classifier, and averages the horizontal and vertical convolution values for the directional-interpolated predetermined color component if the vertical classifier is substantially equal to the horizontal classifier.

17. The apparatus of claim 10, wherein the classifier calculator recalculates the classifiers using the directional-interpolated predetermined color component.

18. The apparatus of claim 10, further comprising:
a second directional interpolator for directional-interpolating the chrominance components depending on the classifiers; and
a color component generator for extracting at least one color component of a pixel using the directional-interpolated chrominance components of the pixel.

* * * * *